Sept. 9, 1958 S. G. ESKIN 2,850,898
THERMAL RESPONSIVE UNIT
Filed Dec. 23, 1953
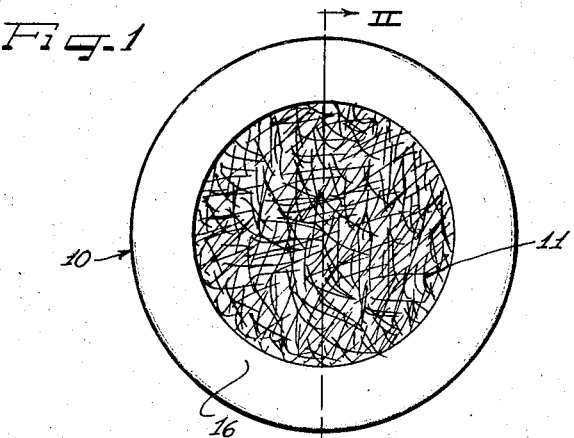
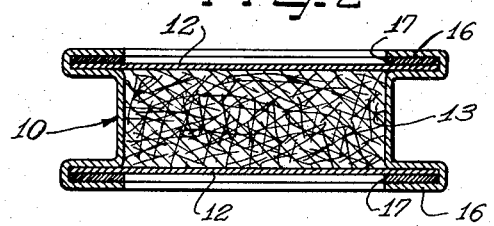
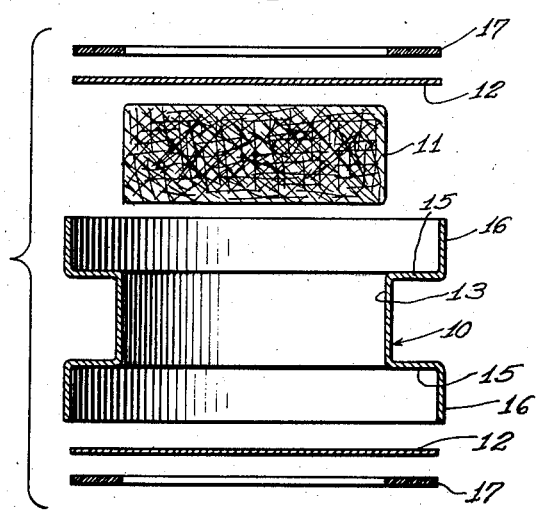
Inventor
SAMUEL G. ESKIN
by Hill, Sherman, Meroni, Gross & Simpson
Attys.

United States Patent Office 2,850,898
Patented Sept. 9, 1958

2,850,898

THERMAL RESPONSIVE UNIT

Samuel G. Eskin, Chicago, Ill., assignor, by mesne assignments, to Antioch College, Yellow Springs, Ohio, a corporation of Ohio Application December 23, 1953, Serial No. 399,947

3 Claims. (Cl. 73—358)

This invention relates to improvements in thermal responsive units and has as its principal objects to provide such a unit which utilizes thin metallic discs to confine a thermally expansible material and to act as the power members of the thermal responsive unit.

Another object and feature of the present invention to provide a novel thermal responsive unit having a relatively small displacement upon increases in temperature and having sufficient power to operate under substantial loads.

Another object of the present invention is to provide a thermal responsive unit of a simple and novel construction in which a body of thermally expansible fusible material and metal wool is confined in a casing by oppositely acting metallic discs.

Still another object of my invention is to provide a thermal responsive unit particularly adapted for operation by a thermally expansible material comprising a material which expands on fusion and a heat conducting element of metal wool.

Still another object of my invention is to provide a thermal responsive unit having a relatively large diameter casing in which both ends of the casing are closed by thin metallic discs sealed to the casing and confining a thermally expansible material to the casing.

A further and more detailed object of my invention is to provide a thermally responsive unit of a simpler construction and more positive action than former units, in which a spool like casing contains a thermally expansible element acting in opposite directions against thin metallic diaphragms sealed to the casing by spinning the casing thereto.

Another object of my invention is to provide a thermal responsive unit comprising an open ended casing containing a thermally expansible material and having thin spring temper metallic discs closing opposite ends of the casing and sealed thereto by gaskets and the spinning of the rim of the casing into engagement with the gaskets.

These and other objects of my invention will appear from time to time as the following specification proceeds and with reference to the accompanying drawings wherein:

Figure 1 is a top plan view of a thermal responsive unit constructed in accordance with my invention, showing the top diaphragm removed;

Figure 2 is a transverse sectional view taken substantially along line II—II of Figure 1, but showing both diaphragms closing opposite ends of the casing; and Figure 3 is an expanded view of the thermal responsive unit shown in Figures 1 and 2.

In the embodiment of my invention illustrated in the drawings, I have shown a spool like container or casing 10 for a thermally responsive element or medium 11 arranged to act against oppositely disposed hardened thin metallic diaphragms or discs 12, 12 closing opposite ends of the casing.

As shown in the drawings, the casing 10 is of a spool like form, having a generally cylindrical chamber 13, annular flanges or shouldered portions 15, 15 extending outwardly from opposite ends of said chamber, and rims 16, 16 which may be spun or otherwise engaged with gaskets 17, 17 retaining the discs 12, 12 to close opposite ends of the chamber 13 and sealing opposite ends of the casing.

The gasket 17 may be a natural or synthetic rubber seal of various known forms, an asbestos compound, or may be a dead soft lead seal. The asbestos seal has been found to be of advantage in certain instances, since with such a seal it is unnecessary to use a heavy bend over pressure, when sealing the seal to the casing and diaphragm. This avoids damage to the thin diaphragm which would be occasioned, by heavy bend over pressures.

The thermally expansible material 11 contained within the casing 10 may, by way of example be a metallic wool, such as a copper or aluminum wool having a fusible material filling the spaces therebetween and expansible on fusion, and being fusible in the operating range of the device. One form of fusible material of particular advantage for low temperature operating ranges is a paraffin wax while other forms of fusible materials of particular advantage for high temperature operating ranges are micro-crystalline waxes.

Other thermally expansible materials which may be used are crystalline materials having a plastic or elastic binding material in solution and having finely divided particles of a solid heat conducting material dispersed through and coated with the solution, so that the finely divided solid heat conducting particles are bound together by the binder into a solid body. A material of this type is described in United States Letters Patent No. 2,259,846, so need not be described in detail. It is of course, understood that I do not wish to be restricted to the materials mentioned herein, and that may other materials having similar expansible properties may be used.

The metallic discs or diaphragms 12, 12 may be made of a thin stainless or spring steel, or from a phosphor bronze or any other suitable spring material. The diaphragms 12, 12 may also be in the form of a plurality of spring steel discs or shims as in my joint invention with Joseph M. Algino, Serial No. 367, 395, filed July 13, 1953 and entitled "Thermal Responsive Element."

In assembling the thermal responsive unit, the thermally expansible material 11, in the form of a cylinder is first placed within the chamber 13 with its opposite ends in substantial alignment with the shoulders formed by the flanges 15, 15. The diaphragms 12, 12 are then placed into engagement with the shoulders of flanges 15, 15 and are abutted by the annular seals 17, 17. The rims 16, 16 are then bent or spun into engagement with the seals 17, 17, holding the diaphragms 12, 12 to the shoulders 15, 15 and effectively sealing the chamber 13.

The spun or bent over rims 16, 16 engaging the seals 17, 17 thus hold the diaphragms 12, 12 to the shoulders 15, 15, and seal the thermally expansible material 11 to the casing 10. As the temperature to which the thermostatic element is subjected rises and the thermally expansible material 11 reaches its critical fusing or melting point the diaphragms 12, 12 will flex outwardly to operate a device to be operated.

As the temperature drops below the critical operating point, the diaphragms 12, 12 are held by the gaskets 17, 17 to return to their biased positions of their own resiliency, and return the thermally expansible material to its original position.

It will be understood that various modifications and variations of the present invention may be effected without departing from the spirit and scope of the novel concepts thereof.

I claim as my invention:

1. In a thermal responsive unit, a spool like casing having a generally cylindrical wall and having a diameter to height ratio greater than unity, annular flanges extending outwardly from said wall adjacent opposite ends thereof, a body of thermally expansible material comprising a metal wool and a fusible material intermixed therewith and contained within said casing, relatively flat thin flexible metal diaphragms abutting said flanges and retaining the body of thermally expansible material within said casing and forming resilient power members for the thermostatic unit, annular seals abutting said diaphragms, and said flanges having rims pressed into engagement with said seals and sealing said diaphragms to said flanges.

2. A thermal responsive unit comprising a spool like casing having a generally cylindrical chamber having a diameter to height ratio greater than unity, annular flanges extending from opposite ends of said chamber and having rims extending at right angles with respect thereto, a body of thermally expansible material contained within said casing in engagement with the wall of said chamber, a pair of metallic diaphragms abutting said flanges, and annular seals of an asbestos compound abutting the outsides of said diaphragms adjacent the periphery thereof, and said rims having engagement with said seals and sealing said diaphragms to said casing.

3. A thermostatic element comprising a generally cylindrical casing having a diameter to height ratio greater than unity, a metallic wool material substantially evenly distributed within said casing, a fusible thermally expansible material in said casing intermixed with said metallic wool material and therewith filling said casing, and flexible metal diaphragms closing the ends of said casing, said casing having portions spun over the radially outer portions of said diaphragms to seal said fusible thermally expansible material in said casing.

References Cited in the file of this patent

UNITED STATES PATENTS

| | | |
|---|---|---|
| 376,850 | Bishop | Jan. 24, 1888 |
| 2,128,274 | Vernet | Aug. 30, 1938 |
| 2,220,902 | Hastings | Nov. 12, 1940 |
| 2,265,586 | Vernet | Dec. 9, 1941 |
| 2,371,288 | Frownfelter | Mar. 13, 1945 |

FOREIGN PATENTS

| | | |
|---|---|---|
| 11,632 | Great Britain | 1887 |
| 327,978 | Great Britain | Apr. 14, 1930 |
| 621,261 | Great Britain | Apr. 6, 1949 |